1

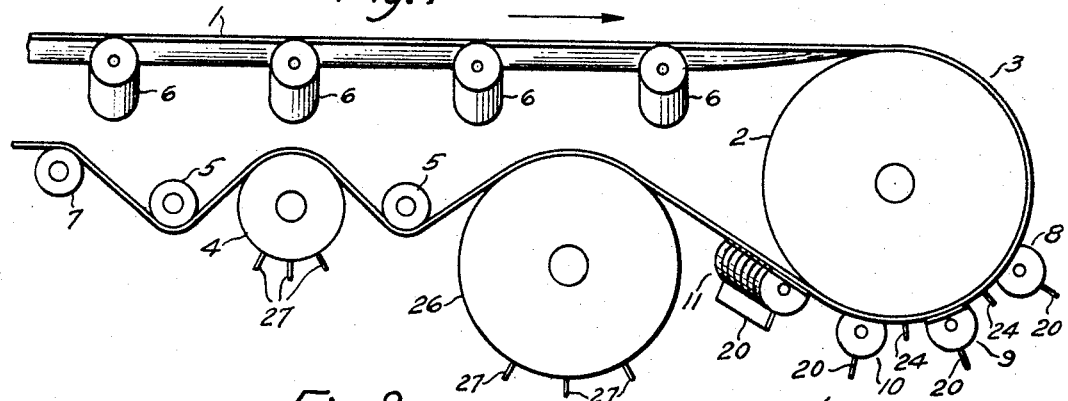
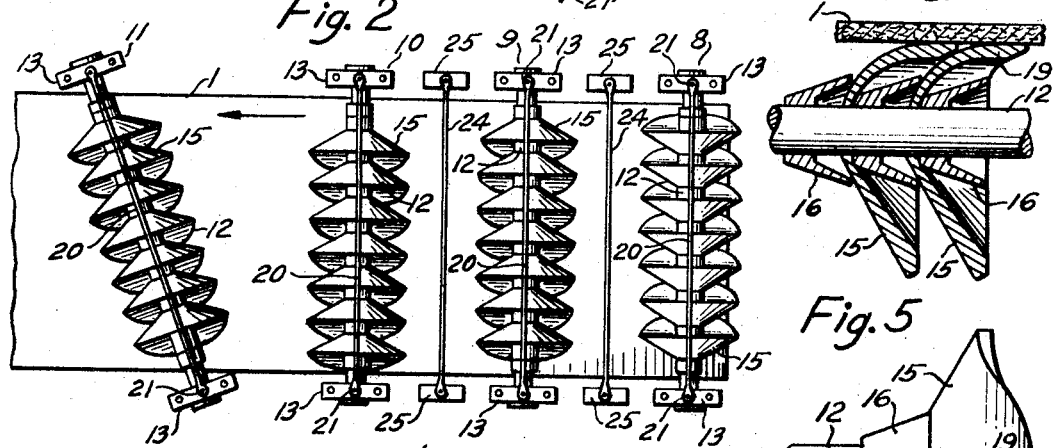
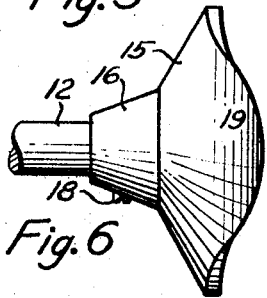
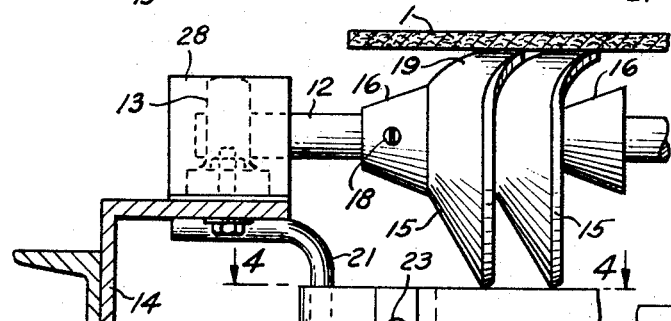
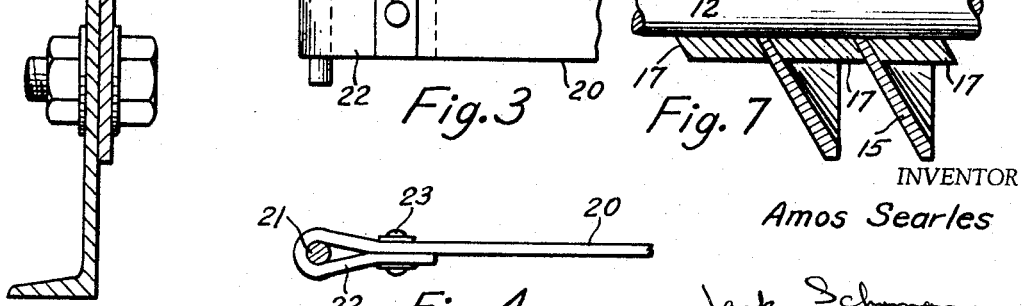
INVENTOR
Amos Searles
ATTORNEY

3,430,758
CONVEYOR BELT CLEANER
Amos Searles, 643 Adams Ave.,
Scranton, Pa. 18510
Filed May 17, 1967, Ser. No. 639,101
U.S. Cl. 198—230       11 Claims
Int. Cl. B65g 45/00

ABSTRACT OF THE DISCLOSURE

Resilient conical discs are deflected and rotated by a moving conveyor belt. The deflected segments sweep across the face of the conveyor belt and clean material therefrom. Tensioned resilient bands engage the peripheries of the discs to remove material adhering thereto. Other tensioned resilient bands are interposed between adjacent disc assemblies as baffles. A reverse bend roll and snub pulley squeegee water from the moving conveyor belt, and tensioned resilient bands engage the surfaces of the reverse bend roll and snub pulley to remove the squeegeed water therefrom.

Background of the invention

This invention relates broadly to the field of conveyor belts, and specifically to a conveyor belt cleaner.

My prior United States Patent 3,047,133, entitled "Conveyor Belt Cleaner," discloses, as its title indicates, apparatus for cleaning conveyor belts, and the disclosed apparatus comprised a plurality of pairs of resilient discs adapted to be deflected away from each other, and rotated, by a moving conveyor belt. The continuously presented deflected segments swept across the face of the conveyor belt to remove foreign matter therefrom. While my prior patent disclosed an operable, and most useful, apparatus for cleaning conveyor belts, in time it became apparent that certain improvements thereto were merited. For instance, my prior patent did not disclose means for wiping the edges of the resilient discs to remove adherent material, nor baffle means between adjacent assemblies of resilient discs.

Summary of the invention

One of the objects of this invention is to provide an improved conveyor belt cleaner effective to clean the face of the conveyor belt after the conveyor belt has passed the discharge end of the conveyor belt installation, and to remove water therefrom.

Still other and further objects of this invention will become apparent during the course of the following description.

I have discovered that the foregoing objects can be attained by providing a number of belt cleaning assemblies engaging the conveyor belt along its return stretch, each belt cleaning assembly comprising a series of resilient conical discs deflected and rotated by the moving conveyor belt, the deflected segments sweeping across the face of the belt to remove foreign matter therefrom. I provide tensioned resilient bands engaging the edges of the discs to remove adherent matter. I also provide tensioned resilient bands between adjacent belt cleaning assemblies to act as baffles and prevent material centrifugally discharged by the preceding belt cleaning assembly from reaching the succeeding belt cleaning assembly. I further provide a snub pulley and a reverse bend roll to squeegee water from the conveyor belt, and tensioner resilient bands engaging the reverse bend roll and snub pulley to remove the squeegeed water therefrom.

Brief description of the drawing

Referring now to the drawing, in which like numerals represent like parts in the several views:

2

FIGURE 1 represents a view in elevation, partially diagrammatic, of one end of a conveyor belt system, showing schematically the improved belt cleaning assemblies, baffles and wipers, the direction of movement of the conveyor belt being indicated by the arrow.

FIGURE 2 represents a view of the improved belt cleaning assemblies of the present invention and of their arrangement relative to each other and to the conveyor belt, which view has been taken looking upwardly at the right end of FIGURE 1 and which view has been developed linearly longitudinally of the conveyor belt, the direction of movement of the conveyor belt being indicated by the arrow.

FIGURE 3 represents a view in vertical elevation, showing one end of a typical belt cleaning assembly and mounting means therefor, it being understood that the opposite end thereof is similarly mounted.

FIGURE 4 represents a detail of the manner of mounting a wiper to adjacent structure, as viewed in plan along the line 4—4 of FIGURE 3.

FIGURE 5 represents a view in vertical section of several adjacent cleaning discs of a belt cleaning assembly, engaging and deflected by a portion of the conveyor belt, showing one arrangement for mounting the discs to the shaft of the belt cleaning assembly.

FIGURE 6 represents a view in plan of a typical cleaning disc as deflected by the conveyor belt (not shown), indicating the deflected circular segment thereof active in the cleaning operation.

FIGURE 7 represents a view in vertical section of several adjacent cleaning discs of a belt cleaning assembly, engaging and deflected by a portion of the conveyor belt, showing an alternative arrangement for mounting the discs to the shaft of the belt cleaning assembly.

Description of the preferred embodiment

A conventional conveyor belt installation, as shown in FIGURE 1, may comprise conveyor belt 1, head pulley 2 at the discharge end 3 of the installation, snub pulleys 4 and 5, troughing load bearing idler rolls 6 and return idler rolls 7. The entire conveyor belt installation has not been shown in the drawing, as the same is not necessary to a complete understanding of the present invention. It will, however, be understood that there is a head pulley at the other, loading, end of the installation. Such installation is shown in FIGURE 1 of my prior United States Patent 3,047,133. The means for driving the conveyor belt installation are well known, and are therefore not illustrated herein.

In the preferred embodiment herein illustrated, four belt cleaning assemblies 8, 9, 10 and 11, are spaced along the direction of travel of conveyor belt 1. Belt cleaning assemblies 8, 9 and 10 are disposed transversely of conveyor belt 1, and belt cleaning assembly 11 is disposed obliquely to conveyor belt 1.

Each belt cleaning assembly 8, 9, 10 and 11 comprises shaft 12 rotatably mounted in pillow blocks 13 suitably supported on adjacent framework structure 14 of the conveyor belt installation. On each shaft 12, a series of conical resilient cleaning discs 15 are mounted, all said discs 15 on the same shaft 12 being aligned in the same direction (i.e., with their peripheries all facing the same end of shaft 12). These discs 15 are maintained in axially restrained relation by means of conical collars 16 as shown in FIGURE 5, or by means of sleeves 17 with concave and convex conical ends at either end thereof as shown in FIGURE 7. The endmost collars 16, or sleeves 17, may be secured to shaft 12 in an appropriate manner, as by means of set screws 18, thereby to prevent any general displacement longitudinally of shaft 12 of the interior collars or sleeves 17, and of the discs 15.

Preferably, the discs 15 are clamped between adjacent collars 16, or sleeves 17, in such manner as to be securely fixed to shaft 12 and incapable of rotation relative to shaft 12.

Belt cleaning assemblies 8, 9, 10 and 11 are mounted adjacent to conveyor belt 1 in such position and proximity that discs 15 engage, and are rotated and deflected by, the moving conveyor belt 1, as particularly shown in FIGURES 3, 5 and 7. In this manner, rotating discs 15 continuously present deflected circular segments 19 to the conveyor belt 1.

The discs 15 of the belt cleaning assemblies 8, 9, 10 or 11 being securely mounted on a rotatable shaft 12, the said discs 15 and shaft 12 are rotated by the frictional contact of the linearly moving conveyor belt 1 with the deflected circular segments 19 of the said discs 15. The velocity of all points on a radius of rotating disc 15 in the deflected circular segment 19 cannot be the same relative to the linearly moving conveyor belt 1, and it will be apparent that such relative velocities will vary along the radius of disc 15 in the deflected circular segment 19 lengthwise and crosswise of the conveyor belt 1. This phenomenon is treated in greater detail in my prior United States Patent 3,047,133, with particular reference to FIGURE 4 thereof. This phenomenon of varying relative velocities of points on a radius of rotating disc 15 in the deflected circular segment 19 with respect to the linearly moving conveyor belt 1 produces a sweeping cleaning action which is quite effective in removing foreign matter from the face of the conveyor belt 1.

Discs 15 may be molded with that portion adjacent the periphery thereof being thicker than the central portion thereof, as particularly shown in FIGURES 5 and 7. I have found that the thinner central portion of disc 15 facilitates segmental flexing of the periphery thereof, and that the thicker peripheral portion provides improved frictional contact or engagement with conveyor belt 1. Thus, with the thicker periphery as shown in the preferred embodiment, the major force applied by the linearly moving conveyor belt 1 to rotate discs 15 will be adjacent the periphery of the deflected circular segments of discs 15.

Conical discs 15, as mounted on shaft 12 to constitute a belt cleaning assembly, have their peripheral portions offset, axially of shaft 12, from the central portions thereof in the direction of deflected circular segments 19. This factor gives an initial leverage or impetus in the formation of the deflected circular segments 19, and for this reason alone it is advantageous to mount all discs 15 on a common shaft 12 with their peripheries facing the same end of shaft 12.

It is preferred to employ a series of belt cleaning assemblies to completely clean the entire face of conveyor belt 1. It has been found that an arrangement as shown in FIGURE 2 is quite effective in providing efficient cleaning of the conveyor belt 1. It will be noted that the discs 15 of the lead belt cleaning assembly 8 have their peripheries all facing in a first direction, i.e., facing to one side of the conveyor belt 1, and that the discs 15 of the next-in-line belt cleaning assembly 9 have their peripheries all facing in a second and opposite direction, i.e., facing to the other side of conveyor belt 1. It will also be noted that the final belt cleaning assembly 11 is positioned obliquely to the direction of movement of conveyor belt 1.

The material carried by conveyor belt 1 may have characteristics varying all the way from dry and granular and dusty to sticky and quite wet. Within this range, some of these materials may cling or adhere to discs 15 after being removed from conveyor belt 1, and may thereupon be returned to conveyor belt 1. This, of course, could result in a serious decrease in cleaning efficiency. I have discovered that such materials tend to migrate to the peripheries of the discs 15 and can effectively be removed therefrom by means of a wiper, specifically a wiper comprising a tensioned band of resilient material, such as rubber or other elastomeric material. Such wipers 20 are shown in FIGURES 1, 2 and 3. Each wiper 20, comprising a band of elastomeric material such as rubber, is associated with one belt cleaning assembly and engages, with very light pressure, the undeflected peripheries of all of the discs 15 of the belt cleaning assembly, preferably diametrically opposite the deflected segments 19 of the discs 15. Each wiper 20 is supported in tension between brackets 21 suitably mounted to adjacent framework structure 14 as shown in FIGURE 3. A convenient mounting arrangement is shown in detail in FIGURE 4. Thus, each end of wiper 20 is doubled back on itself to form a loop 22 held by a bolt 23 passed through the doubled portion of the wiper 20. Brackets 21 are in the form of a pin, and loops 22 at each end of wiper 20 are readily placed over the ends of the brackets 21, wiper 20 being securely held thereby in tension. While the discs 15 of a belt cleaning assembly are rotated by the moving conveyor belt 1, material adhering to the peripheries of discs 15 is brushed off by wiper 20 which, because of its elastic nature and tensioned mounting, is caused to vibrate by the peripheries of rotating discs 15 and the material adhering to the peripheries of the said rotating discs 15. The vibrating action of wiper 20 has been found to produce a very effective cleaning action on the peripheries of discs 15 and serves also to propel the removed material away from the immediate vicinity of the rotating discs 15.

Generally speaking, belt cleaning assemblies 8, 9, 10 and 11 are positioned in fairly close proximity to each other, in a location where conveyor belt 1 is flat in a transverse or lateral sense and also under tension. Under such conditions of proximity, there ordinarily would be some centrifugal discharge of material removed from conveyor belt 1 by the discs 15 of one belt cleaning assembly onto the succeeding belt cleaning assembly. Thus, discs 15 on belt cleaning assembly 8 could discharge into belt cleaning assembly 9, thus reducing the operational efficiency of belt cleaning assembly 9. I have discovered that this effect can be avoided by installing a baffle between adjacent belt cleaning assemblies, specifically a baffle comprising a tensioned band of resilient material, such as rubber or other elastomeric material. Such baffles 24 are shown in FIGURES 1 and 2, the baffles 24 being supported in tension between brackets 25 suitably mounted on adjacent framework structure similar to the adjacent framework structure 14 mounting pillow blocks 13 and brackets 21. The details of mounting baffle 24 between brackets 25 may be the same as the details of mounting wiper 20 between brackets 21 as shown in FIGURE 4. Thus, loops can be formed at either end of baffle 24 by doubling back the ends thereof to form the said loops, and holding said loops by means of bolts passed through the doubled portions, and by placing these loops over pins on the brackets 25 thereby to securely support the baffles 24 in tension. Baffles 24, upon receiving material centrifugally discharged by the discs 15 of the preceding belt cleaning assembly, are stretched and caused to vibrate. This vibrating action serves to propel the material away from the vicinity of conveyor belt 1, thereby preventing said material from reaching the succeeding belt cleaning assembly. Baffles 24 are preferably mounted in close proximity to, but not engaging, conveyor belt 1, and are of width sufficient to intercept all material centrifugally discharged by the discs 15 of the preceding belt cleaning assembly.

It sometimes happens that water must be removed from conveyor belt 1, and the present invention incorporates means therefor. A flat reverse bend roll 26 is provided and engages conveyor belt 1 as shown in FIGURE 1. A plurality of wipers 27 is provided for reverse bend roll 26, and a similar plurality of wipers 27 is provided for snub pulley 4, which is also flat. Each wiper 27 comprises a tensioned band of resilient material, such as rubber or similar elastomeric material, aligned parallel to the longitudinal axis of the reverse bend roll 26, or snub pulley 4, and engaging the surface of the said reverse bend roll 26, or snub pulley 4. Each wiper 27 may be mounted in tension between brackets similar to brackets 25 or 21 and secured to adjacent framework structure similar to the adjacent framework structure 14 supporting pillow blocks 13 and brackets 21. Moreover, each wiper 27 may have loops formed at either end thereof, in a manner similar to wipers 20, and seated over pins on the brackets at either end thereof. It will be apparent that wipers 27 being formed of bands of tensioned resilient material, the edges thereof engaging reverse bend roll 26, or snub pulley 4, will be straight. Conveyor belt 1 assumes, in cross-section, a troughed profile as it carries a load over troughing load bearing idlers 6, and this profile is retained in part as the conveyor belt 1 passes over the return idler rolls 7. The flat reverse bend roll 26 insures transverse flatness of the conveyor belt 1, and thus good contact between conveyor belt 1 and reverse bend roll 26, and between reverse bend roll 26 and wipers 27, is assured. Reverse bend roll 26 and, to a lesser extent snub pulley 4, squeezes or squeegees water from the surface of conveyor belt 1. This water accumulates on, and drains down to the lower portion of, the reverse bend roll 26 and snub pulley 4. Wipers 27, in engagement with the rotating surfaces of reverse bend roll 26 and snub pulley 4, removes the accumulated water from the said surfaces. Wipers 27, because of their tensioned state and resilient nature, are caused to vibrate by virtue of their engagement with the said rotating surfaces, and this vibratory action effectively disperses the water away from the vicinity of the conveyor belt 1.

Pillow blocks 13 are ordinarily exposed to severe operating conditions, including grit and corrosion. It is preferred, therefore, that they be covered by a housing 28 packed with grease. Such a housing 28 may be built up with flexible strips of suitable material assembled, wrapped over and held in permanent position as shown in FIGURE 3.

The operation of the preferred embodiment should be apparent from the foregoing description but will be repeated in very concise manner.

The moving conveyor belt 1 deflects segments 19 of discs 15 and causes the discs 15 to rotate. The continuously presented deflected segments 19 provide a sweeping action across the face of the conveyor belt 1 effective to remove foreign matter therefrom. Wipers 20 remove material adhering to the peripheries of the discs 15 and, as these wipers 20 are in a vibrating state, such removed material is thrown by the wipers away from the discs 15 and conveyor belt 1. Baffles 24 between the belt cleaning assemblies intercept material centrifugally discharged by the discs 15 of the preceding belt cleaning assembly and, as these baffles 24 are resilient and in a vibrating state, such material is thrown from the vicinity of the conveyor belt 1 and belt cleaning assemblies. Reverse bend roll 26 and snub pulley 4 squeegee water from the reverse bend roll 26 and snub pulley 4 and, as these wipers 27 are in a vibrating state, such water is thrown from the vicinity of the conveyor belt 1, reverse bend roll 21 and snub pulley 4.

I claim:
1. Conveyor belt and cleaning means therefor, comprising:
 (a) a moving conveyor belt (1),
 (b) a rotatable shaft (12),
 (c) a plurality of resilient conical discs (15) mounted on said shaft (12), said rotatable shaft (12) and said plurality of resilient conical discs (15) being located in such proximity to said moving conveyor belt (1) that all of said resilient conical discs (15) engage said moving conveyor belt (1) and are deflected and rotated thereby, the deflected portions of said resilient conical discs (15) presenting circular segments (19) in sweeping engagement with said moving conveyor belt (1) and rotating parallel to that portion of said moving conveyor belt (1) being cleaned by the sweeping engagement therewith of said circular segments (19).

2. Conveyor belt and cleaning means therefor as in claim 1, further comprising:
 (d) the peripheries of all of said resilient conical discs (15) facing the same end of said shaft (12).

3. Apparatus for cleaning a moving conveyor belt by removing material therefrom, said apparatus comprising:
 (a) a rotatable shaft (12),
 (b) a plurality of resilient conical discs (15) mounted on said shaft (12), said plurality of resilient conical discs (15) being adapted to engage said moving conveyor belt (1) and to be deflected and rotated thereby, the deflected portions of said discs (15) presenting circular segments (19) in sweeping engagement with said conveyor belt (1) and rotating parallel to that portion of the conveyor belt (1) being cleaned,
 (c) wiping means (20) engaging the peripheries of all of said discs (15) at a point removed from the deflected portions (19) thereof, said wiping means (20) being adapted to remove material therefrom.

4. Apparatus as in claim 3, said wiping means comprising a tensioned resilient band (20) extending parallel to said shaft (12) and engaging the peripheries of all of said discs (15) at a point removed from the deflected portions (19) thereof, said tensioned resilient band (20) being adapted to remove material from the peripheries of said discs (15).

5. Apparatus for cleaning a moving conveyor belt by removing material therefrom, said apparatus comprising:
 (a) a rotatable shaft (12),
 (b) a plurality of resilient conical discs (15) mounted on said shaft (12), said plurality of resilient conical discs (15) being adapted to engage said moving conveyor belt (1) and to be deflected and rotated thereby, the deflected portions of said discs (15) presenting circular segments (19) in sweeping engagement with said conveyor belt (1) and rotating parallel to that portion of the conveyor belt (1) being cleaned,
 (c) a cylindrical rotatably mounted roll (26) adapted to engage and remove water from said conveyor belt (1),
 (d) wiping means (27) engaging the surface of said cylindrical rotatably mounted roll (26) to remove water therefrom.

6. Apparatus as in claim 5, said wiping means comprising a tensioned resilient band (27) extending parallel to the axis of said roll (26) and engaging the surface of said roll (26) to remove water therefrom.

7. Apparatus for cleaning a moving conveyor belt by removing material therefrom, said apparatus comprising:
 (a) a rotatable shaft (12),
 (b) a plurality of resilient conical discs (15) mounted on said shaft (12), said plurality of resilient coincal discs (15) being adapted to engage said moving conveyor belt (1) and to be deflected and rotated thereby, the deflected portions of said discs (15) presenting circular segments (19) in sweeping engagement with said conveyor belt (1) and rotating parallel to that portion of the conveyor belt (1) being cleaned,
 (c) said shaft (12) and plurality of resilient conical discs (15) constituting a first belt cleaning assembly (8),
 (d) a second belt cleaning assembly (9) comprising:
  (I) a rotatable shaft (12),
  (II) a plurality of resilient conical discs (15) mounted on said shaft (12), said plurality of resilient conical discs (15) being adapted to engage said moving conveyor belt (1) and to be deflected and rotated thereby, the deflected portions of said discs (15) presenting circular segments (19) in sweeping engagement with said conveyor belt (1) and rotating parallel to that portion of the conveyor belt (1) being cleaned, said second belt cleaning assembly (9) being spaced from said first belt cleaning assembly (8) in the direction of travel of said conveyor belt (1), (e) baffle means (24) interposed between said first belt cleaning assembly (8) and said second belt cleaning assembly (9) to intercept material discharged by said first belt cleaning assembly (8).

8. Apparatus as in claim 7, further comprising:
(f) the peripheries of all of said resilient discs (15) in said first belt cleaning assembly (8) facing one edge of said conveyor belt (1),
(g) the peripheries of all of said resilient discs (15) in said second belt cleaning assembly (9) facing the opposite edge of said conveyor belt (1).

9. Apparatus as in claim 7, further comprising:
(f) first wiping means (20) engaging the peripheries of all of the discs (15) in the first belt cleaning assembly (8) at a point removed from the deflected portions (19) thereof, said first wiping means (20) being adapted to remove material therefrom,
(g) second wiping means (20) engaging the peripheries of all of the discs (15) in the second belt cleaning assembly (9) at a point removed from the deflected portions (19) thereof, said second wiping means (20) being adapted to remove material therefrom.

10. Apparatus as in claim 7, said baffle means comprising:
(f) a tensioned resilient band (24).

11. Apparatus as in claim 9, further comprising:
(h) said first wiping means comprising a tensioned resilient band (20) extending parallel to the shaft (12) in the first belt cleaning assembly (8),
(i) said second wiping means comprising a tensioned resilient band (20) extending parallel to the shaft (12) in the second belt cleaning assembly (9).

References Cited
UNITED STATES PATENTS

| | | | |
|---|---|---|---|
| 3,047,133 | 7/1962 | Searles | 198—230 |
| 3,175,672 | 3/1965 | Chengges | 198—1 |
| 3,362,525 | 1/1968 | Fehr | 198—230 |

EVON C. BLUNK, *Primary Examiner.*

ROBERT D. GUIOD, *Assistant Examiner.*